C. P. FLETCHER
A. D. BRUNDAGE
INVENTORS

ATTORNEYS

Oct. 14, 1958     A. D. BRUNDAGE ET AL     2,856,475
SPEEDOMETER WARNING DEVICE

Filed Jan. 23, 1957                                                 3 Sheets-Sheet 2

C. P. FLETCHER
A. D. BRUNDAGE
INVENTORS

BY *E. C. McRae*
*J. R. Faulkner*
*J. H. Oster*

ATTORNEYS

Oct. 14, 1958   A. D. BRUNDAGE ET AL   2,856,475
SPEEDOMETER WARNING DEVICE

Filed Jan. 23, 1957                                   3 Sheets-Sheet 3

C. P. FLETCHER
A. D. BRUNDAGE
INVENTORS

BY  E.C. McRae
    J. R. Faulkner
    J. H. Oster

ATTORNEYS

United States Patent Office 2,856,475
Patented Oct. 14, 1958

2,856,475
SPEEDOMETER WARNING DEVICE

Alan D. Brundage, Birmingham, and Cicero P. Fletcher, Harrison Township, Mich., assignors to Ford Motor Company, Dearborn, Mich., a corporation of Delaware Application January 23, 1957, Serial No. 635,641

8 Claims. (Cl. 200—56)

There have been many attempts in the art to provide a unique and reliable speed warning device for automobile vehicles and the like. In the instant application, the applicants have provided a novel arrangement of a speed warning device which is incorporated within a speedometer housing for greater compactness, accuracy and operation.

The instant disclosure is illustrative of a tape type magnetic driven speedometer in which the tape is unwound off one speed cup and wound upon the other speed cup. The speedometer is mechanically driven through a flexible cable from the transmission and rotates its speed cup by eddy current means. The other speed cup has arranged within its confines a nonmagnetic holder which is secured to the speedometer housing. A brass gear is mounted on the holder for rotation therewith which rotation is imparted to it through an insulated gear mechanically moved through flexible linkage secured to a dial visibly seen by the operator of the vehicle. A pair of spring biased rollers are mounted in fixed relationship to the brass gear and revolve within the speed cup upon the appropriate movement of the dial indicator knob. The inside radial surface of the speed cup is covered with an insulation material such as acetate which starts at the point wherein the speedometer indicates the tape to be at the zero point and goes as far as desired in the indication of a warning speed. The roller which is positioned at the zero point of the tape is noninsulated whereas the roller positioned at the opposite side is of the insulated variety such as made from a commercially available "nylon" construction. When the vehicle speed has increased to the point where the speed cup has rotated to the position where the rollers have been preset, the noninsulated roller will roll off the tape onto the surface of the speed cup and complete a circuit which will ring a warning device, actuate a light and/or both.

Other objects and advantages will become more apparent when considered in connection with the accompanying drawings wherein.

Figure 1:
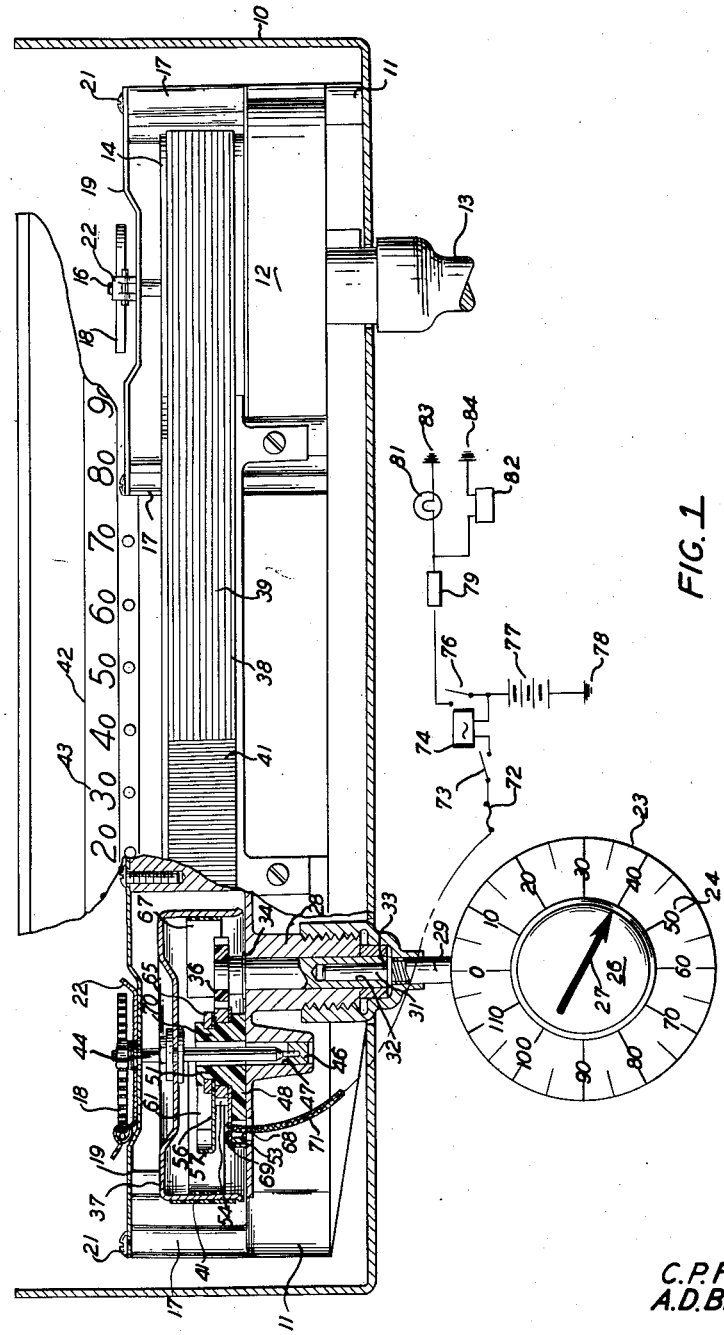
Figure 1 is a partial front view of a speedometer partly in section and showing the insulation of the applicants' novel invention.

Referring now to the drawings and in particular Figure 1, a speedometer housing 10 is shown having an inner speedometer support 11 secured to it by conventional bolt means (not shown). A conventional magnetic type speedometer core 12 having a rotatable speed cup 14 secured to a pivot pin 16 and pivotally mounted in axial alignment therewith is located at the right hand side of the support 11. The speed cup 14 is secured to upstanding stanchions 17 which are integral with the support 11. A hairspring 18 is connected to anchor 22 mounted on the pivot pin 16 and horizontal plate 19 which is secured to the stanchion 17 by bolt means 21. A flexible cable 13 connects the speedometer core 12 with the transmission driving means (not shown).

The applicants' speed setting control consists of a remotely placed centrally apertured dial 23 convenient to the vehicle operator and having a plurality of speed indicating indicia 24 radially displaced thereon. A rotatable knob 26 having an integrally formed pointer 27 is mounted centrally of the dial 23. The knob 26 is in turn threadably connected to a cylindrical depending support 28 by flexible cable means 29 as is shown particularly in Figure 1. The shaft means 29 are provided with a bayonet type end 31 which fits into a like shaped hole 32 in shaft 33 which is journaled in the support 28. A radial shoulder 34 on the shaft 33 prevents axial displacement of the shaft 33 with respect to the support 28. An insulated gear 36, which may be made from such commercially available materials as "nylon," "Bakelite" and other, is mounted to the end of the shaft 33 and is rotated in synchrony with the knob 26.

The speedometer illustrated is of a tape type in which an additional speed cup 37 is provided at the other end of the support 11. A continuous tape 38 having a neutral color 39 and a positive color 41 (such as red) is wound upon the speed cup 37 and connected to the speed cup 14 of the speedometer core 12 so that the neutral color 39 will coincide with the zero marking on the register plate 42 having speed indicating numerals 43 spaced thereon. The register 42 is positioned between the two speed cups so that the movement of the tape as it is unwound off the speed cup 37 and wound upon the speed cup 14 will move underneath the register plate indicia 43. Speed cup 37 is similar to the speed cup 14 in that it is mounted upon a central pivot shaft 44 which in turn rotates on a support member 46 fixedly secured in a vertical aperture 47 in the support 11. As can be seen, the speed warning speed cup 37 is also provided with the hairspring 18 which is secured to the horizontal plate 19 and the spring anchor 22 on the pivot shaft 44. Stanchions 17 provide the support for the horizontal plate 19.

Figure 3:
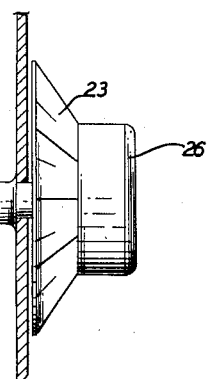
Figure 3 is a cross sectional view partly in elevation of the actuating means of the applicants' invention.
Figure 3:
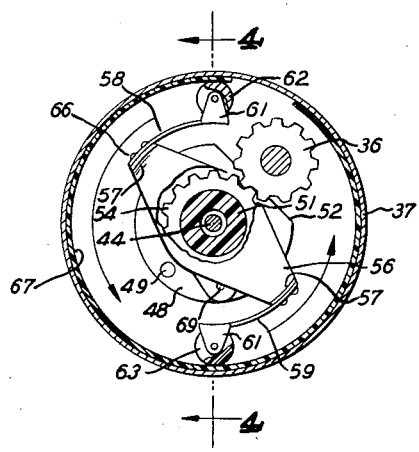
Figure 4:
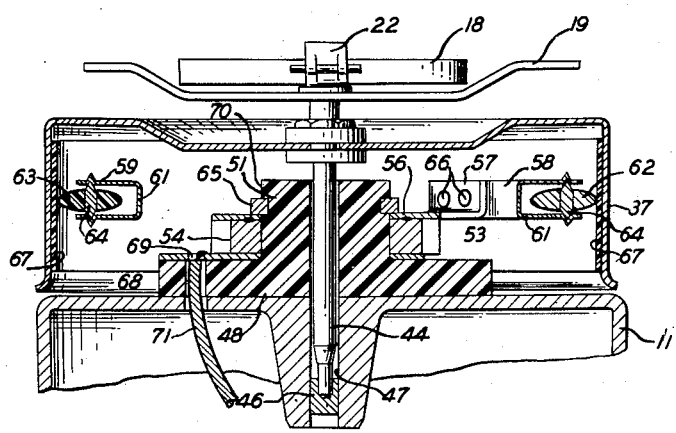
Figure 4 is an enlarged cross sectional view taken on the plane indicated by lines 4—4 of Figure 3.

A rotating brush yoke base 48 also made from commercially available noninsulating "Bakelite" or equivalent materials is secured by a plurality of conventional screws 49 of which only one is shown to the speedometer support 11. The base 48 is provided with a central tubular like apertured body 51 through which the speed cup pivot pin 44 extends and has a flat edge 52 permitting the base 48 to be mounted adjacent the gear 36 without restricting its movement. A noninsulating collector plate 53 tear shaped in appearance is journaled on the base 48 and has positioned on top therewith a gear 54 made of noninsulating material which is in mesh with the manually rotated insulated gear 36. A roller carrier 56 assembly made from copper or equivalent material is fixedly secured to the top of the gear 54 such as by soldering. It is generally elliptical in shape and has a pair of upstanding ends 57 opposed to each other. A pair of roller assemblies 58 and 59 comprising a copper arm having bent forward ends 61 in substantially U-shaped fashion to house either roller 62 or 63. Roller 62 may be made from a noninsulating material such as an aluminum roller and silver plated on the outside while roller 63 is made from an insulated material such as "nylon." The rollers 62 and 63 are journaled on a shaft 64 which turns about an axis parallel with the axis of the speed cup and the two rollers are mounted to the upstanding ends 57 of the roller carrier 56 by rivets 66 or other means in opposed relationship to each other. It can thus be seen in Figures 1, 3 and 4 that the rollers extend beyond the inner configuration of the speed cup and must be pushed inwardly to fit within its confines thus exerting a slight pressure on the inner surface of the speed cup. Because the rollers are positioned opposite each other, there is an equal torquing of the speed cup which prevents cocking of other impedance to the free rotational movements of the speed cup.

The dual assembly of the collar gear and speed rollers are secured to the base 48 by a washer 65 and the formation of a lip 70 in the base 48.

The speed cup is provided with an inner layer of insulation 67 such as acetate beginning at the point normally considered zero. When the knob 26 is rotated, this rotational movement is imparted by the insulated gear to the uninsulated gear mounted on the base rotating the rollers a predetermined amount about the inside of the speed cup. When the vehicle accelerates, the speed cup begins to rotate with respect to the rollers until that speed is attained at which the uninsulated roller rolls off the insulated tape and onto the surface of the speed cup.

The electrical contact may be made by the provision of an enlarged hole 68 in the base which is axially aligned with a like hole 69 in the collector plate 53. In the circuitry shown in Figure 1, a line 71 is connected to the collector plate 53 and to the fuse block 72 which is connected to an off-and-on switch 73. The off-and-on switch is connected to a relay 74 which closes relay contact switch 76. The relay contact switch 76 is connected to the battery 77 and to ground 78 on one side and to the flasher 79 on the other side. The flasher is then connected to a light 81 and buzzer 82 which are in turn connected to ground 83 and 84. It is thus seen that in this particular circuitry, the speed warning device may be made inoperative by simply braking the circuit at the fuse block. This will permit the operator of the vehicle to operate his vehicle at any speed he so wishes without a reaction from the speed warning device.

Figure 2:
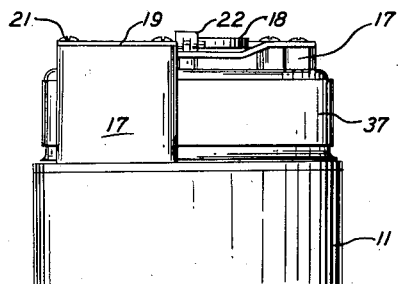
Figure 2 is an end view of Figure 1.
Figure 5:
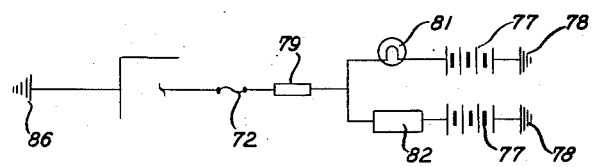
Figure 5 is an alternate design of the electrical circuitry.

An alternate circuit is shown in Figure 5 in which the speed cup is connected to ground 86 while the collector plate 53 is connected to the fuse block 72 and directly to the flasher and buzzer combination and from there to the battery and ground. In the circuitry shown in Figure 1, the device may be able to handle any of the load required to operate a plurality of warning devices regardless of the milliamps required to operate these devices. It has been found in actual operation, however, that the device requires such a small number of milliamps that the circuitry shown in Figure 2 is satisfactory to actuate a flasher light and buzzer individually or in parallel.

It will be understood that the invention is not to be limited to the exact construction shown and described, but that various changes and modifications may be made without departing from the spirit and scope of the invention, as defined in the appended claims.

What is claimed is:

1. A speedometer warning device for use with a fully mounted speedometer in a motor vehicle or the like, said speedometer having at least one speed cup and a housing to which said speed cup is mounted for rotational movement, said speed cup having a predetermined internal insulated area, comprising in combination a contact point rotatably mounted to said housing within the confines of said speed cup, said contact point being normally in engagement with the insulated area of said speed cup, actuating means for selectively moving said contact point with respect to said speed cup and signal means connected to said actuating means whereby the rotation of the speed cup in excess of the predetermined setting of the contact point will result in the contact moving off the insulated area unto the uninsulated area of the speed cup and cause the actuation of the signal means until such time as the contact point returns to the insulated area.

2. A speed warning device for use with a speedometer, said speedometer having a support and a speed cup rotatably mounted to the support, comprising in combination an insulated base secured to said support within the confines of said speed cup, a gear rotatably mounted to said base, a roller, means for securing said roller to said gear, said roller being frictionally engageable with said speed cup, manually positioned means remote from said support for selectively rotating said gear and said roller relative to the speed cup, an insulated coating affixed to said speed cup and normally separating the roller and said speed cup, and signal means connected to said roller, said signal means being operable when the speed cup has rotated to the point where the roller is in friction contact with the speed cup.

3. A speed warning device for use with a speedometer, said speedometer having a support and a speed cup rotatably mounted to the support, comprising in combination an insulated base secured to said support, a gear rotatably mounted to said base, a roller, means for securing said roller to said gear, said roller being frictionally engageable with said speed cup, manually positioned means for selectively rotating said gear and said roller relative to the speed cup, said means including a speed setting dial and a rotatable knob remote from said speedometer, an insulated gear mounted adjacent to and in mesh with said first named gear, flexible cable means connecting said gear with said knob, an insulated coating affixed to said speed cup and normally separating said roller and said speed cup, and signal means connected to said roller, said signal means being operable when the speed cup has rotated to the point where the roller is in friction contact with the speed cup.

4. A speed warning device for use with a speedometer, said speedometer having a support and a speed cup rotatably mounted to the support, comprising in combination an insulated base secured to said support, a gear rotatably mounted to said base, a roller, means for securing said roller to said gear, said roller being frictionally engageable with said speed cup, manually positioned means for selectively rotating said gear and said roller relative to the speed cup, an insulated coating affixed to said speed cup and normally separating the roller and said speed cup, and signal means connected to said roller, said signal means including a collector plate mounted on said base in friction contact with said gear, an audible sound device and a visual light device mounted in said vehicle remote from said speedometer, electrical conduit means connecting said device to said collector plate and an off-on switch connected to the electrical conduit means.

5. A speed warning device for use with a speedometer, said speedometer having a support and a speed cup rotatably mounted to the support, comprising in combination an insulated base secured to said support, a gear rotatably mounted to said base, a carrier secured to said gear, said carrier having an upstanding end, a roller holder secured to said upstanding end and having a substantially U-shaped forward section, a shaft mounted for rotation within said forward section, a roller journaled on said shaft and frictionally engageable with said speed cup, said forward section being flexed inwardly when the roller is against said speed cup, manually positioned means for selectively rotating said gear and said roller relative to the speed cup, an insulated coating affixed to said speed cup and normally separating the roller and said speed cup, and signal means connected to said roller, said signal means being operable when the speed cup is rotated to the point when the roller is in friction contact with the speed cup.

6. An integral speedometer and speed warning device for an automotive vehicle and the like, said vehicle having a tape type speedometer, said speedometer having a speedometer support, a hairspring biased driving and driven speed cup at end of said support respectively and a speed indicating tape connecting the two speed cups, comprising driving means for imparting rotation to the driving speed cup to unwind the speed indicating tape off the driven speed cup onto the driving speed cup, an insulator affixed to the inside of driven speed cup beginning at the zero point of the speed cup and extending radially about the inside of said speed cup a predetermined distance, an insulated base affixed to said support within said driven speed cup, a collector plate affixed to said base, an external tooth gear positioned atop said plate and rotatable with respect to said plate, an elliptically shaped roller carrier having a pair of upstanding ends secured to said gear for rotation therewith, a roller carrier secured to each of said upstanding ends, said carriers having a noninsulated roller in one carrier and an insulated roller in the other carrier, signal means connected to said collector plate, and selector means for rotating said gear and rollers within said driven speed cup whereby a speed in excess of the selector setting will allow the uninsulated roller to contact the speed cup surface actuating the signal means.

7. The structure defined by claim 6 which is further characterized in that said carriers are flexed inwardly to maintain a predetermined pressure by said rollers against the driven speed cup, and that the noninsulated roller is positioned normally against the insulator at the zero point of the speed cup and the insulated roller is positioned diametrically opposite.

8. The structure defined by claim 6 which is further characterized in that said support is provided with a downwardly extending cylindrical extension axially offset from said base and said selector means includes a shaft rotatable within said cylindrical extension, an insulated gear secured to the top of said shaft and meshed with said first named gear, a centrally apertured speed setting dial secured to the vehicle remote from said speedometer, a selector knob mounted within said aperture and flexible means connecting said knob with said shaft.

References Cited in the file of this patent

UNITED STATES PATENTS

| | | |
|---|---|---|
| 1,127,618 | Hartmann | Feb. 9, 1915 |
| 1,527,279 | Smiley | Feb. 24, 1925 |
| 1,696,458 | Sosnowski | Dec. 25, 1928 |
| 2,251,475 | Walker | Aug. 5, 1941 |